United States Patent [19]

Sasaki et al.

[11] Patent Number: 4,764,913

[45] Date of Patent: Aug. 16, 1988

[54] SIGNAL PROCESSING APPARATUS FOR DISC MEMORY DEVICES

[75] Inventors: Hiroshi Sasaki, Hitachi; Tomio Chiba, Katsuta; Mitsuyasu Kido, Hitachi; Yoshio Sato, Hitachi; Atsumi Watanabe, Hitachi, all of Japan

[73] Assignee: Hitachi, Ltd., Tokyo, Japan

[21] Appl. No.: 942,713

[22] Filed: Dec. 17, 1986

[30] Foreign Application Priority Data

Dec. 20, 1985 [JP] Japan .................. 60-287269
Jan. 24, 1986 [JP] Japan .................. 61-11915

[51] Int. Cl.⁴ ............................................. G11B 20/10
[52] U.S. Cl. ........................................ 369/49; 369/48; 369/59; 369/124; 369/111; 360/32; 360/51; 360/27; 358/342
[58] Field of Search ................. 369/49, 48, 47, 59, 369/124, 50, 60, 111; 360/36.1, 36.2, 9.1, 32, 51, 27; 358/337, 338, 339, 342, 320, 321, 322

[56] References Cited

U.S. PATENT DOCUMENTS 4,532,621 7/1985 Nakagawa .................. 369/59
4,550,347 10/1985 Nakamuta .................. 369/50
4,558,375 12/1985 Southeimer ................. 369/111
4,603,412 7/1986 Yamazaki .................. 369/50

*Primary Examiner*—Alan Faber
*Attorney, Agent, or Firm*—Antonelli, Terry & Wands

[57] ABSTRACT

A disc is provided with the equal-interval pits along tracks, at which digital signals are recorded bit by bit. Such a disc is rotated at the constant angular velocity. A signal processing apparatus according to the present invention detects the linear velocity of the track which is at present followed by a pickup. The filtering of a source signal to be recorded and the analog-to-digital conversion of the filtered signal, in the signal processing for recording, are controlled and timed in accordance with the detected linear velocity. Further, the digital-to-analog conversion of a signal read out from the disc and the filtering of the converted signal, in the signal processing for reproducing, are also timed and controlled in response to the detected linear velocity. Thereby, a disc memory device having the large storage capacity and suited for the random access memory can be realized.

6 Claims, 7 Drawing Sheets

FIG. 3
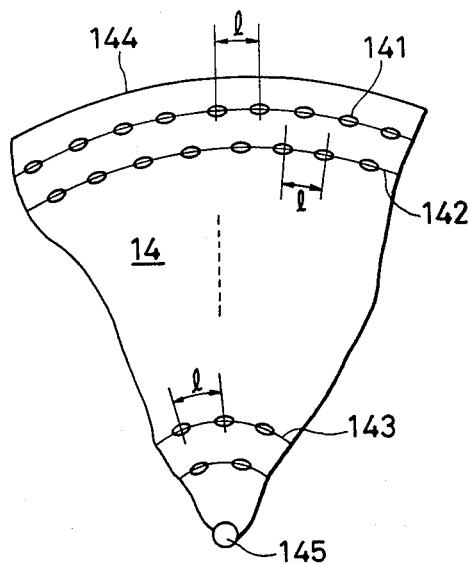
FIG. 4a
FIG. 4b
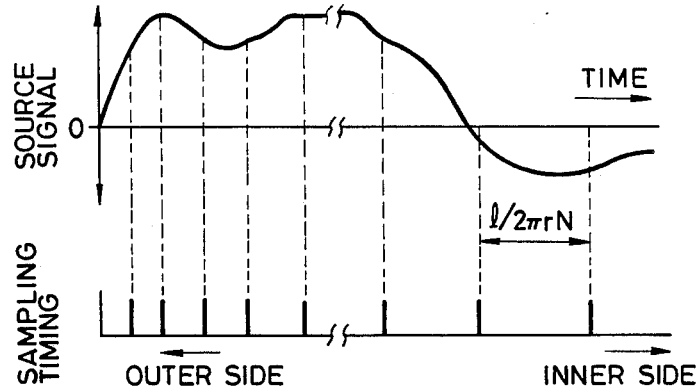

SIGNAL PROCESSING APPARATUS FOR DISC MEMORY DEVICES

BACKGROUND OF THE INVENTION

1. Field of the Invention

The present invention relates to a signal processing apparatus for an optical or magnetic disc memory device which utilizes light or magnetism in order to record or reproduce signals, especially to a signal processing apparatus, which renders a high density recording on a disc memory possible and is suited for application to a random access memory.

2. Description of the Related Art

Disc type memory devices, such as optical disc memories, magnetic disc memories and magneto-optic disc memories, usually have a large storage capacity. As is well known, therefore, they are widely employed not only for audio or video signal recording media in consumer appliances, but also for external data storages in electronic data processing systems.

Conventionally, there are two methods of driving a memory disc; one is a constant angular velocity method (called a CAV, hereinafter) and the other a constant linear velocity method (called a CLV, hereinafter). In the CAV, a memory disc is rotated at a constant angular velocity irrespective of the position of a pickup relative to the disc, i.e., whether the pickup is facing the inner-circumferential portion or the outer-circumferential portion of the disc, whereas, in the CLV, the angular velocity of a rotating memory disc is varied in accordance with the position of a pickup so that the linear velocity of a portion of the disc facing the pickup becomes constant.

In a disc memory, digital signals are bit by bit recorded at pits provided on a disc, and such pits are arranged along plural tracks which are defined on the disc in the circumferential direction thereof. Further, in the CAV, the pits must be so arranged that the interval of two adjacent pits on a track becomes large in the outer tracks, so that a pickup can always pass between two adjacent pits in the constant time and hence the frequency of the signal read out by the pickup becomes constant irrespective of the position of the pickup.

In the CLV, however, the interval of adjacent two pits are maintained constant over the whole tracks on a memory disc. The angular velocity of the rotation of the disc is so changed that it becomes large, when a pickup faces the inner tracks of the disc and small, when the pickup faces the outer tracks, whereby the pickup can always pass between two adjacent pits in the constant time, i.e., the linear velocity of a portion of the disc facing the pickup always becomes constant. As a result, in the same manner as in the CAV, the frequency of the signal read out by the pickup becomes constant irrespective of the change of the angular velocity of the disc.

Compared with the CAV, the CLV can realize a disc memory device with a large storage capacity. This is because, in the CAV, the intervals of two adjacent pits on outer tracks are inevitable to become larger than those on inner tracks, so that the bit density decreases in the outer tracks. On the other hand, the intervals of two adjacent pits in the CLV are always constant in the whole tracks, which can be selected at the minimal value allowed by the resolution of the pickup. Therefore, the bit density on the outer tracks can be heightened in the same manner as on the inner tracks.

By the way, when a disc memory is applied to a so called random access memory, a pickup is required to be able to quickly move in the radial direction of the disc. As already described, in the CLV, the angular velocity of the rotation of a disc must be changed in accordance with the position of a pickup. If, therefore, the CLV is applied to the random access memory, the angular velocity of the disc must be changed in response to the quick movement of the pickup. Practically, it is not possible to quickly change the number of revolutions of the disc, which rotates at the high angular velocity. Therefore, the CLV is not suited for the random access memory.

As mentioned above, there has been no disc memory which has the large storage capacity and is suited for a random access memory. If a disc is provided with equal-interval pits along tracks and rotated at the constant angular velocity, a disc memory device having the large storage capacity and suited for the random access memory can be realized. With this, however, the time necessary for passage of two adjacent pits under the pickup is varied in accordance with the position of the pickup. As a result, there occurs the problem, as understood from the foregoing description, that the frequency of the signal read out by the pickup changes in accordance with the position of the pickup relative to the disc.

SUMMARY OF THE INVENTION

An object of the present invention is to provide a signal processing apparatus in which there can be solved the above mentioned problem in a disc memory device having a disc which is provided with equal-interval pits and rotated at the constant angular velocity, whereby a disc memory device having the large storage capacity and suited for the random access memory can be realized.

A feature of the signal processing apparatus according to the present invention is in that the linear velocity of a track which is at present followed by the pickup is detected. The filtering of a source signal to be recorded and the analog-to-digital conversion of the filtered source signal, in the signal processing for recording, are controlled and timed in accordance with the detected linear velocity. Further, the digital-to-analog conversion of the signal read out from the disc and the filtering of the converted signal, in the signal processing for reproducing, are also timed and controlled in response to the detected linear velocity.

BRIEF DESCRIPTION OF THE DRAWINGS

FIG. 3 is also an explanatory drawing of the recording manner on a memory disc, especially of the manner of arrangement of signal pits, at which digital signals are recorded bit by bit;

FIGS. 4a and 4b are diagrams for explaining the relation between a source signal to be recorded and timing of sampling;

DESCRIPTION OF THE PREFERRED EMBODIMENT

Figure 1:
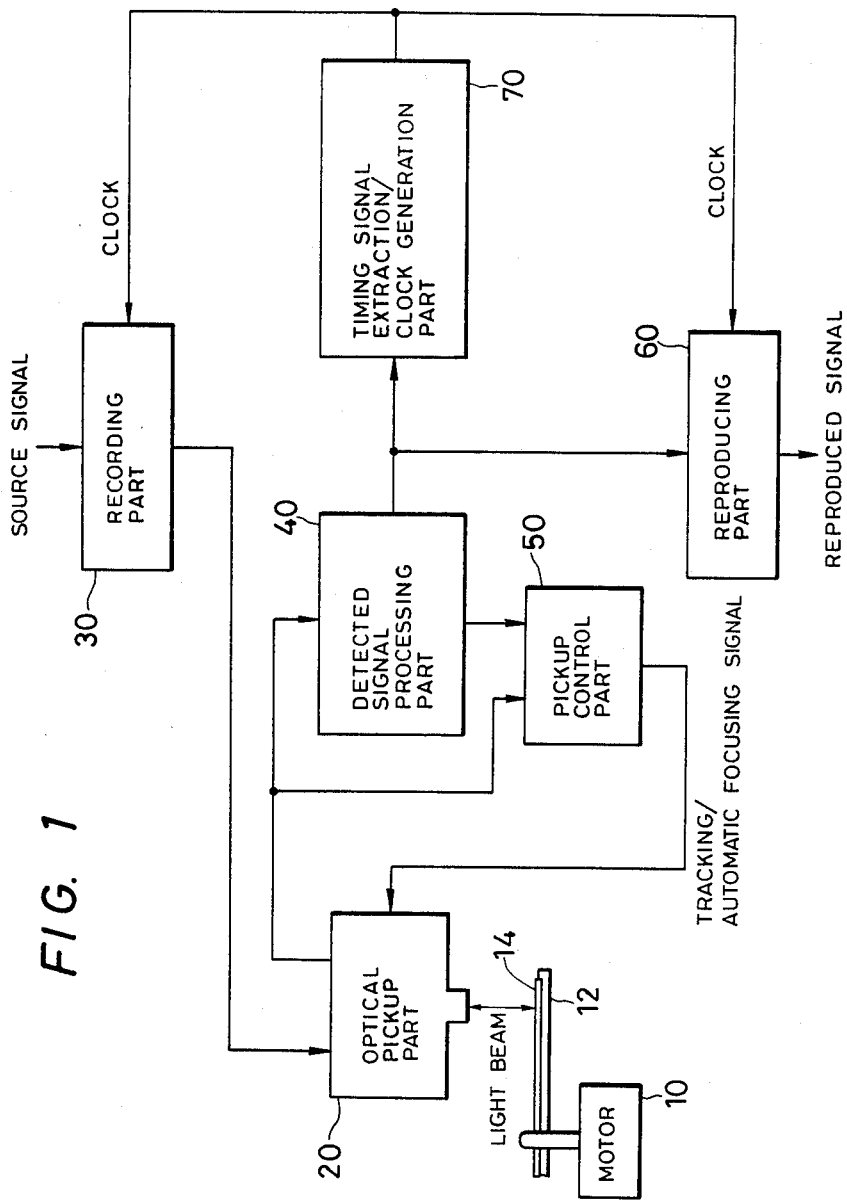
FIG. 1 is a block diagram showing a general construction of a signal processing apparatus for a disc memory device according to an embodiment of the present invention.

Referring at first to FIG. 1, the description will be made of the general construction of a signal processing apparatus according to a preferred embodiment of the present invention. Although the following embodiment is directed to an optical disc memory device, it is to be understood that the present invention is also applicable to other type of disc memory devices such as magnetic or magneto-optic ones.

In the figure, reference numeral 10 denotes a driving motor, which drives a turntable 12 at a constant angular velocity. A memory disc 14 is put on the turntable 12 to rotate therewith. Signals are written in and read out from the disc 14 through a light beam emitted by an optical pickup part 20 or reflected from the disc 14.

The optical pickup part 20 includes a laser diode and its driver for generating a light beam as well as other optical system for emitting the generated light beam to the disc 14 and receiving a reflected light beam therefrom. This part 20 further has a mechanism for tracking a designated one of tracks provided on the disc 14 along which signals are recorded, and a mechanism for automatically focusing a light beam on the surface of the disc 14.

Reference numeral 30 denotes a recording part, in which a source signal to be recorded is processed and changed into the signal form suitable for recording. Namely, the source signal is subjected to the processing such as an analog-to-digital conversion, a coding of the converted digital signal, a modulation of the coded signal including the measures against code error, and so on. The output signal of this part 30 is led to the optical pickup part 20, in response to which the emission of the light beam by the laser diode is controlled. The processing in this part 30 is controlled by a timing signal and a clock signal. The frequency of the clock signal is determined in accordance with the position of the track which is followed by the pickup part 20 at that time, i.e., an inner track (a center side of the disc) or an outer one (a peripheral side thereof). The timing signal and the clock signal will be explained in detail later.

A signal, which is obtained by converting the reflected light beam from the disc 14, is led to a detected signal processing part 40 and a pickup control part 50. The part 40 subjects the received signal to the predetermined processing and detect various kinds of information recorded on the disc 14. The pickup control part 50 receives the signals from both the optical pickup part 20 and the detected signal processing part 40 and produces signals for the tracking and the automatic focusing of the optical pickup part 20.

An output signal of the detected signal processing part 40 is led to a reproducing part 60, in which the output signal is subjected to the processing such as a demodulation including the correction of error code and a digital-to-analog conversion, and a reproduced signal is generated. Similarly to the processing in the recording part 30, this processing is controlled by the timing signal and the clock signal, which is produced by a timing signal extraction/clock generation part 70.

Before the explanation of the detailed arrangement of the above mentioned signal processing apparatus, the description will be made of the timing signal and the clock signal in the following.

Figure 2:
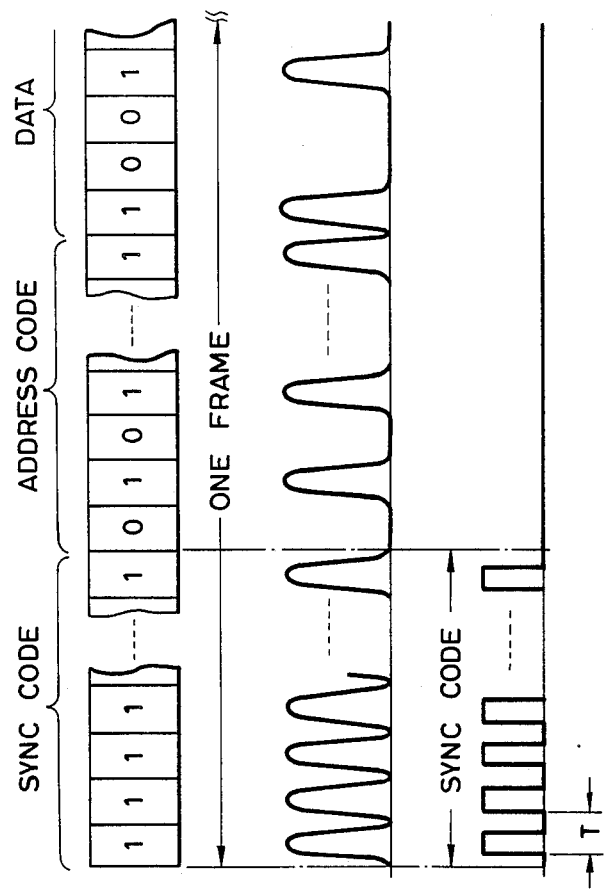
FIGS. 2a to 2c are explanatory drawings of the recording manner on a memory disc, in which there are shown an example of the format of a record signal on a memory disc and signals read out therefrom.

FIG. 2a shows an example of the format of information recorded on the disc 14. The information is recorded on and read out from the disc 14 every frames, to each of which a particular address is assigned. The information of one frame is made up of a plurality of bits, which are shared to a synchronizing code, an address code and data. In the address code area is recorded the address code which is assigned to the frame. Data of the signal to be recorded are written in the data area in the form of the coded digital signal.

The synchronizing code is a code for detecting the linear velocity of a portion of the disc 14, i.e. a track, which is followed by the pickup part 20, and for extracting the timing signal for the operation of the recording part 30 and the reproducing part 60. The detected linear velocity is used for generating the clock signal. The synchronizing code area consists of the predetermined number m of bits, in each of which a logical "1" is written. When "1"s of the number m are detected in succession, the timing signal is created. In order to distinguish the synchronizing code from other signals, a logical "0" is inserted into appropriate bits of the address code and the data so that the number of continuous "1" does not exceed m.

The informations constructed in such a manner as mentioned above are bit by bit recorded at pits 141 provided along tracks 142, 143 defined on the disc 14, as shown in FIG. 3. In the present invention, the pits 141 are spaced at equal intervals 1 on every tracks, i.e., on the outer track 142 closer to the periphery 144 of the disc 14 as well as on the inner track 143 closer to the center 145 thereof.

When a light spot focused by the pickup part 20 on the disc 14 is considered to move relatively to the pits 141, the time necessary for movement of the light spot between two adjacent pits 141 is determined by the relation of $l/2\pi r N$, wherein r represents a distance in the radial direction from the center 145 to the track 142, 143 which is followed by the pickup part 20 at that time and N the number of revolutions of the disc 14. This time indicates the period of bits (bit signals) forming the digital signals read out from the disc 14. As apparent from the above mentioned relation, the period or the frequency of the bit signal read out varies in accordance with the radius r of the track which is followed by the pickup part 20 at that time, because the disc 14, as already mentioned, is rotated at the constant angular velocity (i.e., constant N).

Therefore, in the analog-to-digital conversion during the recording, a source signal to be recorded is sampled at the period according to the radius r of the track which is followed by the pickup at that time, i.e., the position of the pickup part 20. In the digital-to-analog conversion during the reproduction of a recorded signal, since the period of bit signals read out varies in accordance with the position of the pickup part 20, the digital signals must be converted into the analog signals in view of the variation of the period of the bit signals.

An example of the relation between a source signal to be recorded and the timing of sampling for the analog-to-digital conversion is as shown in FIG. 4. The similar fact is applicable to the reproduction of the recorded signal. Namely, since the recorded bit signals are read out at the timing which is indicated as the sampling timing in FIG. 4b, the recorded signal can not be reproduced with high fidelity, unless it is taken into account that the period of bit signals read out are different in accordance with the position of the pickup part 20.

To cope with this situation, the clock signal, the period or the frequency of which depends on the linear velocity of the track which is followed by the pickup part 20 at that time, is used. The clock signal is generated on the basis of the extracted synchronizing signal as shown in FIG. 2c. Namely, since the period T of the extracted timing signal is in proportion to the above mentioned relation $1/2\pi rN$, the frequency of the clock signal can be determined by measuring the period T.

Figure 5:
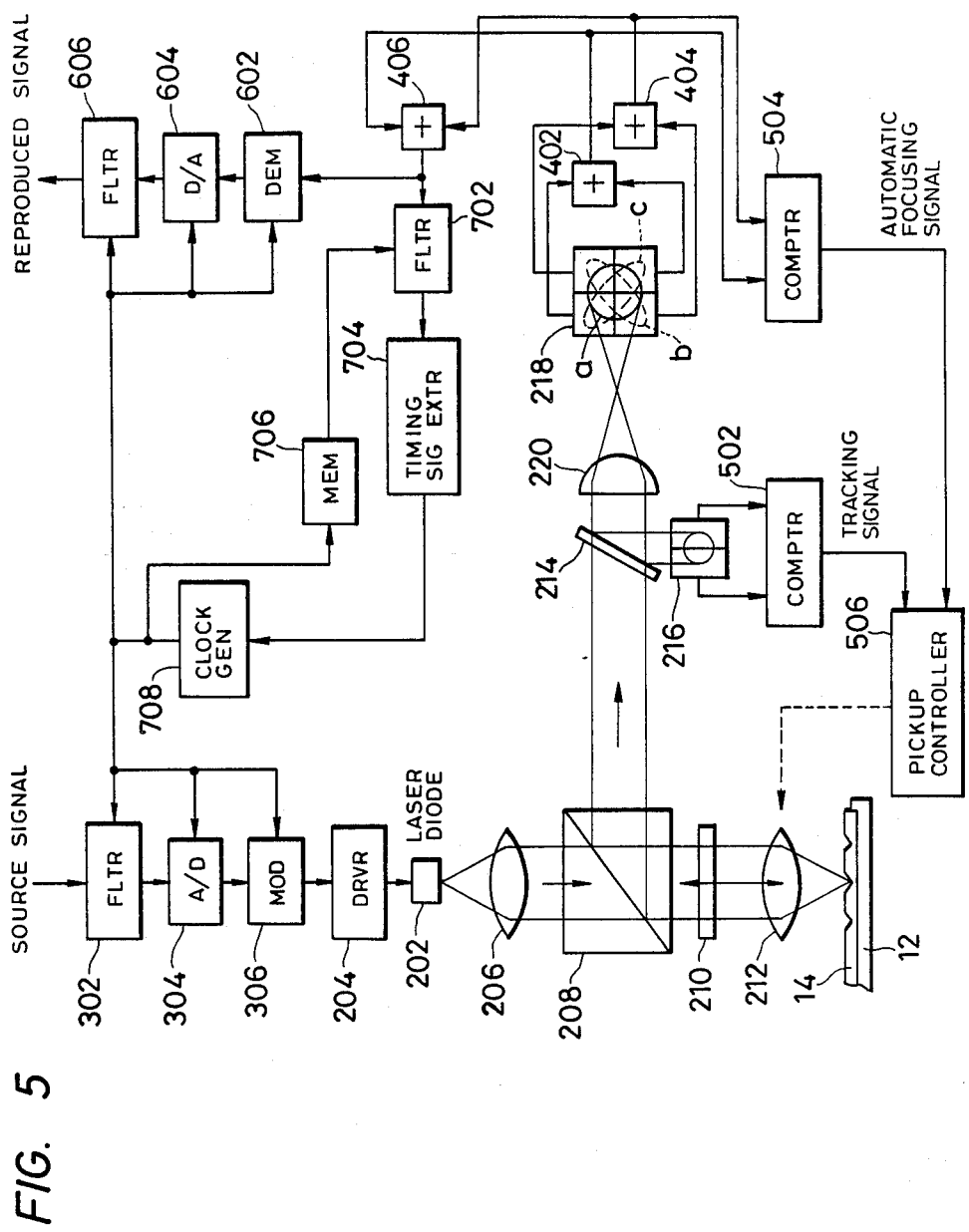
FIG. 5 shows the detailed arrangement of the signal processing apparatus shown in FIG. 1.

Referring now to FIG. 5, the arrangement of the signal processing apparatus will be described in detail in the following.

The optical pickup part 20 includes a laser diode 202 and its driver 204, and emits light necessary for recording, reproducing or erasing. A collimate lens 206 changes the emitted light into a parallel light beam. The parallel light beam passes through a beam splitter 208 and a quarter-wave plate 210 to reach a focus lens 212, which focuses the parallel light beam onto a predetermined one of tracks on the disc 14. A light beam, which is reflected from the surface of the disc 14 and passes through the lens 212 and the quarter-wave plate 210, is refracted by the beam splitter 208 to be led to a half mirror 214. The half mirror 214 passes a part of the received light beam and refracts a remaining part thereof so that light beam from the beam splitter 208 is divided into two beams, one of which is led to a 2-divided photosensor 216 and the other to a 4-divided photosensor 218 through a cylindrical lens 220.

The 2-divided photosensor 216 serves the tracking operation. The photosensor 216 has two separate sensing components, outputs of which are both applied to a comparator 502 of the pickup control part 50. When the light spot focused by the lens 212 on the surface of the disc 14 follows a predetermined track accurately, the light beam split by the half mirror 214 equally illuminates the two sensing components of the photosensor 216. Accordingly the outputs of the two sensing components of the photosensor 216 becomes equal, and therefore the comparator 502 produces no output signal.

If the light spot focused on the surface of the disc 14 gets out of the right track, the unbalance occurs in the illumination of the two sensing components of the photosensor 216. As a result, the comparator 502 produces a tracking signal, which is sent to a pickup controller 506. The controller 506 operates in response thereto and positions the light spot focused by the lens 212 to follow the predetermined track. When the light spot returns to the right track, the output of the comparator 502 disappears and the operation of the pickup controller 506 comes to a pause. In this manner, the tracking operation is performed.

The automatic focusing operation is performed by the aid of the 4-divided photosensor 218, which has four separate sensing components. Outputs of the two sensing components of the photosensor 218, which lie in the diagonal position, are added to each other in adders 402 and 404, respectively. Outputs of both the adders 402 and 404 are applied to a comparator 504 of the pickup control part 50, in which an automatic focusing signal is produced in the following manner.

When the parallel light beam is focused by the lens 212 on the surface of the disc 14 accurately, a light spot projected by the cylindrical lens 220 to the photosensor 218 becomes circular, as shown by a solid line a, so that the four sensing components are equally illuminated. At this time, the outputs of the four sensing components are all equal, and therefore the two outputs of the adders 402 and 404 are also equal to each other. As a result, the comparator 504 produces no output signal. If, however, the parallel light beam is focused over or below the surface of the disc 14, the light spot on the photosensor 218 is changed to the elliptic form by the function of the cylindrical lens 220.

For example, if the parallel light beam is focused below the surface of the disc 14, the light spot on the photosensor 218 becomes the ellipse as shown by a broken line b, so that the two sensing components connected to the adder 404 are illuminated much more than those connected to the adder 402. Accordingly, the output of the adder 404 becomes larger than that of the adder 402. On the contrary, when the parallel light beam is focused over the surface of the disc 14, the light spot becomes the ellipse as shown by a broken line c, so that the two sensing components connected to the adder 402 are illuminated much more than those connected to the adder 404. As a result, the output of the adder 402 becomes larger than that of the adder 404.

The different outputs of the adder 402 and 404 are applied to the comparator 504, which produces an automatic focusing signal on the basis of the comparison result. Further, the ellipticity of the elliptic light spot on the photosensor 218 depends on the degree of the displacement of the focused point of the parallel light beam from the surface of the disc 14. Therefore, the magnitude of the automatic focusing signal is proportional to the degree of the displacement of the focused point. Such automatic focusing signal is led to the pickup controller 506, whereby the automatic focusing can be achieved.

The recording part 30 is formed by a filter 302, an analog-to-digital converter 304 and a modulator 306. The filter 302 is a low-pass filter capable of cutting off the harmonic components included in the source signal which have frequencies higher than a certain frequency. The filter of this kind is known as a filter for eliminating the influence of a so called aliasing noise which occurs in the sampling of a continuous signal and causes the signal reproductivity to reduce. The aforesaid certain frequency, at which the cut-off frequency of this filter 302 is selected, must be varied in accordance with the position of the track which is followed by the pickup at that time. When the pickup follows the inner track close to the center of the disc 14, the cut-off frequency is set at a lower frequency, and when the pickup follows the outer track remote from the center of the disc 14, it is set at a higher frequency.

The analog-to-digital converter 304 converts the analog source signal into a digital signal by sampling the source signal and coding the sampled value. As is well known as the sampling theorem, the sampling of a continuous signal is usually conducted at the frequency which is higher than double the maximal frequency included in the frequency spectrum of the continuous signal. If a source signal includes components of frequencies higher than the sampling frequency, the noise called the aliasing noise occurs to make it difficult to reproduce the source signal with high fidelity. Therefore, such components must be excluded from the source signal by the filter before it is subject to the analog-to-digital conversion.

By the way, the sampling period, and hence the sampling frequency must be varied in accordance with the position of the pickup, as already described. Accordingly, the cut-off frequency of the filter is also varied in response to the variation of the sampling frequency. To this end, a switched capacitor filter is employed in this embodiment. Although details thereof will be described later, the cut-off frequency of the switched capacitor filter can be varied by controlling the frequency of a clock signal applied thereto.

The converted digital signal is led to the modulator 306, in which it is modulated in the form suited for operating the driver 204 for the laser diode 202. The modulation in the modulator 306 usually includes the measures for error correction.

In the recording part 30 mentioned above, the number of signals sampled from the source signal changes in accordance with the position of the pickup. Namely, when the pickup faces the outer tracks, the number of the sampled signals increases because of the high sampling frequency which is generated due to the high linear velocity detected, whereas it decreases when the pickup follows the inner tracks. Accordingly, the minimal necessary number of signals to be sampled from the source signal must corresponds to the necessary number of signals sampled at the time when the pickup follows the most inner tracks. Further, if it is necessary to make the number of signals sampled from the source signal equal irrespective of the position of the pickup, the operation becomes as follows. A gate is provided after the modulator 306, which is controlled by the clock signal generated according to the detected linear velocity. The analog-to-digital conversion of the source signal is done at an appropriate constant sampling frequency every frames, and the converted digital signals for one frame are output bit by bit to the driver 204 in response to the clock signal.

The detected signal processing part 40 is made up of three adders 402, 404 and 406. Thereamong, the adders 402 and 404 have been already referred to in connection with the pickup control part 50. The outputs of both the adders 402 and 404 are added to each other in the adder 406. As a result, the output of the adder 406 is in proportion to the total quantity of light received by the 4-divided photosensor 218, which corresponds to the recorded signal read out from a certain pit on the disc 14. Therefore, the reproduced signal can be generated by processing the output of the adder 406. Further, the output of the adder 406 includes the synchronizing signal, from which the timing signal and the clock signal necessary for the operation of the recording part 30 and the reproducing part 60 are produced.

The reproducing part 60 includes a demodulator 602, a digital-to-analog converter 603 and a filter 604. The output signal of the adder 406 is demodulated in the demodulator 602 and led to the digital-to-analog converter 604, in which the digital signal read out from the disc 14 is converted into the analog signal. The converted analog signal is output as the reproduced signal through the filter 606, by which higher harmonic components created in the digital-to-analog conversion can be suppressed. Since, as described above, the period of the bit signals read out is varied in accordance with the position of the pickup, the demodulation and the digital-to-analog conversion must be conducted in synchronism with the clock signal the frequency of which depends on the position of the pickup. Also the filter 606 must be a filter the cut-off frequency of which is changeable. To this end, similarly to the filter 302, a switched capacitor filter is employed as the filter 606.

The timing signal extraction/clock generation part 70 includes a filter 702, a timing signal extractor 704, a memory 706 and a clock generator 708. Also in this case, a switched capacitor filter is employed as the filter 702. The output signal of the adder 406 as shown in FIG. 2b is applied to the timing signal extractor 704 through the filter 702. In the extractor 704, the applied signal is shaped and the synchronizing signal as shown in FIG. 2c is extracted. In the manner as already mentioned, the timing signal is created on the basis of a series of pulses of the synchronizing signal, and the pulse period T of the synchronizing signal is detected.

The period T is once stored in the memory 706 and used for the determination of the cut-off frequency of the filter 702, whereby the filter 702 is controlled so as to be able to pass a component of the maximal frequency among components included in an input signal of the extractor 704. The memory 706 has the memory time sufficient for maintaining a value of the period T detected by the extractor 704 until the transient response of the switched capacitor filter 702 is stabilized. The value of the detected period T is also applied to the clock generator 708, in which the clock signal of the frequency corresponding to the period T is generated.

Next, a switched capacitor filter employed in this embodiment will be explained with reference to FIGS. 6 to 8.

Figure 6:
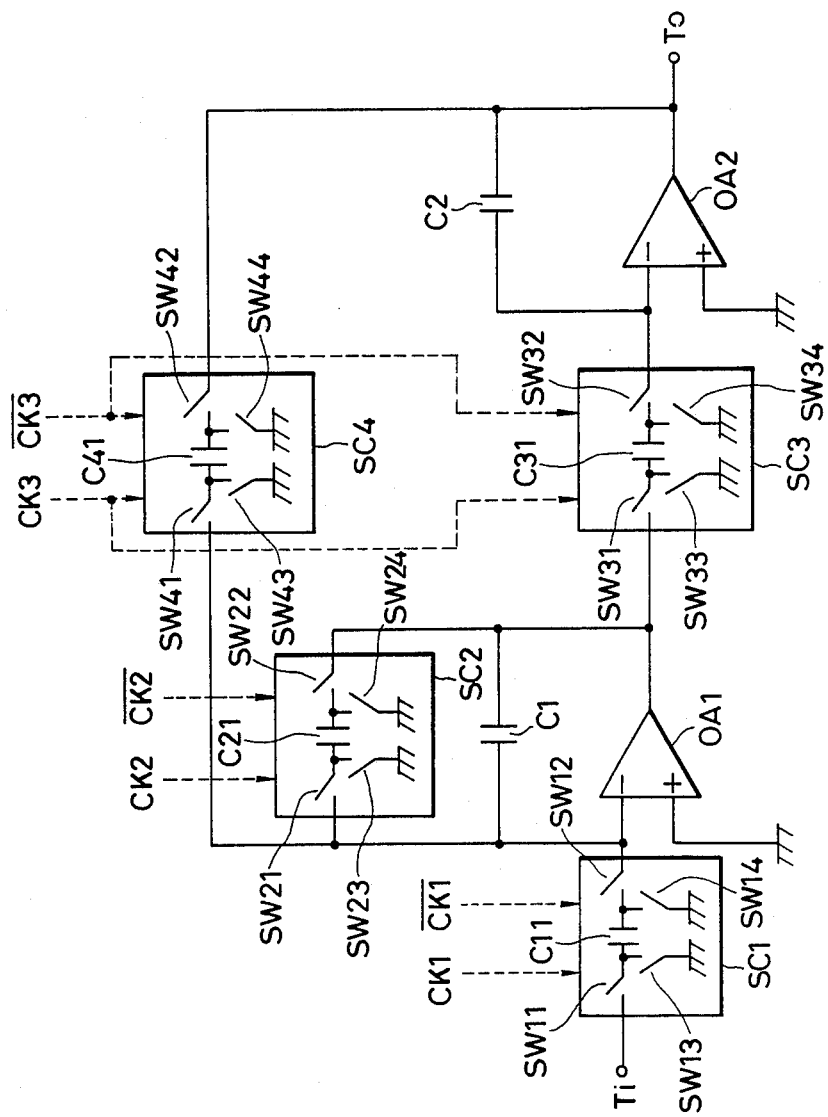
FIG. 6 shows the arrangement of a switched-capacitor filter as an example of a filter used in the signal processing apparatus shown in FIG. 5.

FIG. 6 shows an arrangement of a second-order low pass filter which utilizes switched-capacitor equivalent resistors (for convenience' sake, called SC resistors, hereinafter). The SC resister SCI is formed of switches SW11 to SW14 and capacitor C11. Other SC resisters SC2 to SC4 have the same construction. As described in detail later, the SC resistors SC1 to SC4 change their equivalent resistance values by varying the frequency of the switching operation of the switches SW11 to SW14, SW21 to SW24, SW31 to SW34 and SW41 to SW44. Reference symbols C1 and C2 denote capacitors, and 0A1 and 0A2 operational amplifiers. So to say, a switched capacitor filter shown in FIG. 6 is equivalent to an active filter in which usual resistors included therein are substituted by the SC resistors.

In the SC resistor SC1, the switches SW11 and SW12 are closed when the clock CK1 is "1", and the switches SW13 and SW14 are closed when the clock $\overline{CK1}$ is "1". Similarly, the switches SW21 and SW22 of the SC resistor SC2 are closed when the clock CK2 is "1", and the switches SW23 and SW24 thereof are closed when the clock $\overline{CK2}$ is "1". Further, the SC resistors SC3 and SC4 are operated by the common clocks CK3 and $\overline{CK3}$, so that the switches SW31, SW32 and SW41, SW42 are closed when the clock CK3 is "1", and the switches SW33, SW34 and SW43, SW44 are closed when the clock $\overline{CK3}$ is "1". In the cases mentioned above, the clocks $\overline{CK1}$, $\overline{CK2}$ and $\overline{CK3}$ are inverted ones of the respective clocks CK1, CK2 and CK3.

Figure 7A:
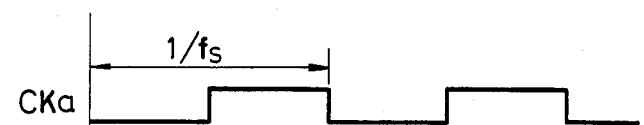
FIGS. 7a to 7c show examples of clock signals supplied for the filter shown in FIG. 6.
Figure 7B:
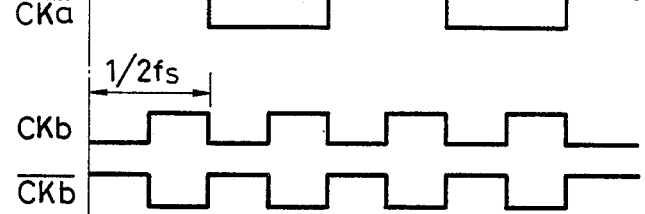
Figure 7C:
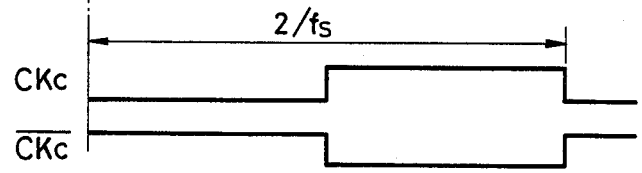

FIGS. 7a to 7c show examples of the aforesaid clocks CK1, CK2 and CK3 and their inverted ones. A pair of the clocks CKa and $\overline{CKa}$ have the frequency $f_s$ as shown in FIG. 7a. A pair of the clocks CKb and $\overline{CKb}$ shown in FIG. 7b have the frequency $2f_s$, i.e., double the frequency of the clocks CKa and $\overline{CKa}$. As shown in FIG. 7c, a pair of the clocks CKc and $\overline{CKc}$ have the frequency $f_s/2$, i.e., half the frequency of the clocks CKa and $\overline{CKa}$. Further, the clock CKa is applied to the SC resistors SC1, SC2, SC3 and SC4 as the clock CK1, CK2 or CK3, and the clock $\overline{CKa}$ is applied thereto as the clock $\overline{CK1}$, $\overline{CK2}$ or $\overline{CK3}$. The same is true of the clocks CKb, $\overline{CKb}$ and CKc, $\overline{CKc}$. Further, it is to be understood that the frequencies as shown in FIGS. 7a to 7c are indicated only by way of examples and they are changeable as needed.

Now, the transfer function of the second-order low pass filter as shown in FIG. 6 is represented as follows:

$$\frac{H\frac{\omega_0}{Q}S}{S^2 + \frac{\omega_0}{Q}S + \omega_0} \quad (1)$$

wherein $\omega_0$ indicates the angular frequency, Q the selectivity and H the gain. Further, the cut-off frequency $f_c$, the selectivity Q and the gain H of the filter are given by the following formulas:

$$f_c = \tfrac{1}{2}\pi f_{s3}\sqrt{\frac{C31\ C41}{C1\ C2}} \quad (2)$$

$$Q = f_{s3}/f_{s2}\sqrt{\frac{C31\ C41\ C1}{C21^2\ C2}} \quad (3)$$

$$H = \frac{f_{s1}}{f_{s2}}\frac{C11}{C21} \quad (4)$$

wherein $f_{s1}$, $f_{s2}$ and $f_{s3}$ are the frequencies of the clocks CK1 and $\overline{CK1}$, CK2 and $\overline{CK2}$, and CK3 and $\overline{CK3}$, respectively and C1, C2, C11, C21, C31 and C41 represent the capacitance values of the capacitors indicated by the same reference symbols in FIG. 6.

As apparent from the formular (2), assuming that the capacitance values of the respective capacitors are fixed, the cut-off frequency $f_c$ can be altered by varying the frequency $f_{s3}$ of the clocks CK3 and $\overline{CK3}$. When the frequency $f_{s3}$ is changed, the selectivity Q, as apparent from the formular (3), also varies, if the capacitance values of the respective capacitors are fixed. Then, the frequency $f_{s2}$ of the clocks CK2 and $\overline{CK2}$ must be varied simultaneously in order to prevent the selectivity Q from changing. Further, as understood from the formular (4), when the the frequency $f_{s2}$ is changed, the gain H varies accordingly, if the capacitance value of the respective capacitors are fixed. Therefore, also the frequency of the clocks CK1 and $\overline{CK1}$ has to be varied at the same time in order to prevent the gain H from changing.

To sum up, the frequencies of all the clocks CK1 and $\overline{CK1}$, CK2 and $\overline{CK2}$, and CK3 and $\overline{CK3}$ need to be altered together for the purpose of controlling the cut-off frequency $f_c$ without any influence on other factors, i.e., the selectivity Q and the gain H. Inversely, only the cut-off frequency $f_c$ can be controlled, if the frequencies of all the clocks CK1 and $\overline{CK1}$, CK2 and $\overline{CK2}$, and CK3 and $\overline{CK3}$ are varied together.

Figure 8A:
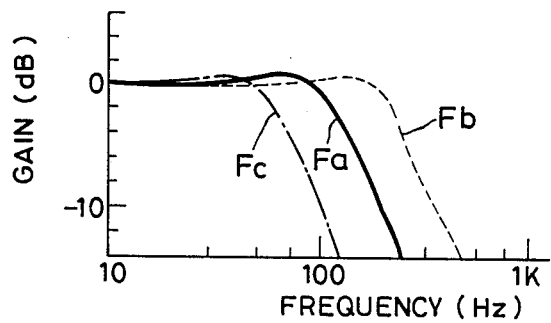
FIGS. 8a and 8b are drawings for explaining the filtering characteristics of the filter shown in FIG. 6.

Then, if the pair of the clocks CKa and $\overline{CKa}$ as shown in FIG. 7a are commonly applied to the SC resistors SC1 to SC4 as the clocks CK1 and $\overline{CK1}$, CK2 and $\overline{CK2}$, and CK3 and $\overline{CK3}$, the frequency band characteristic of the filter is as shown by a solid line Fa in FIG. 8a. When the pair of the clocks CKb and $\overline{CKb}$ as shown in FIG. 7b, the frequency of which is double that of the clocks CKa and $\overline{CKa}$, are utilized as the clocks CK1 and $\overline{CK1}$, CK2 and $\overline{CK2}$, and CK3 and $\overline{CK3}$, the frequency band characteristic of the filter is as shown by a broken line Fb in FIG. 8a. As apparent from the comparison of the characteristics Fa and Fb, the cut-off frequency in the latter case doubles that in the former case. If the pair of the clocks CKc and $\overline{CKc}$ as shown in FIG. 7c, the frequency of which is half that of the clocks CKa and $\overline{CKa}$, are utilized as the clocks CK1 and $\overline{CK1}$, CK2 and $\overline{CK2}$, and CK3 and $\overline{CK3}$, the frequency band characteristic of the filter is as shown by a chain line Fc in FIG. 8a. Compared with the characteristic Fa, the cut-off frequency in the characteristic Fc becomes half that in the characteristic Fa.

Further, in the switched-capacitor filter shown in FIG. 6, also the selectivity Q and the gain H can be independently controlled by selectively varying the clocks CK1 and $\overline{CK1}$, CK2 and $\overline{CK2}$, and CK3 and $\overline{CK3}$. In the following, the control of the selectivity Q will be described. Although the controllability of the selectivity Q and the gain H has no direct relation to the feasibility of the present invention, it is useful for the improvement of the performance of the filter used in the present invention.

The selectivity Q can be changed by maintaining the frequency of the clocks CK3 and $\overline{CK3}$ fixed and varying the frequencies of the clocks CK1, $\overline{CK1}$ and CK2, $\overline{CK2}$ together. Namely, if the pair of the clocks CKa and $\overline{CKa}$ as shown in FIG. 7a are commonly applied to the SC resistors SC1 to SC4 as the clocks CK1 and $\overline{CK1}$, CK2 and $\overline{CK2}$, and CK3 and $\overline{CK3}$, the selectivity characteristic of the filter becomes as shown by a solid line Qa in FIG. 8b. This condition of application of the clocks corresponds to that in the case of the frequency band characteristic Fa shown in FIG. 8a.

Figure 8B:
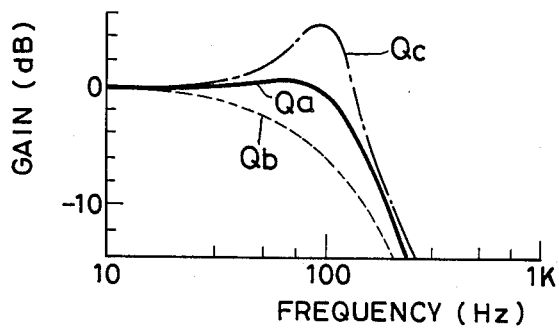

In contrast therewith, when the pair of the clocks CKb and $\overline{CKb}$ are commonly utilized as the clocks CK1, $\overline{CK1}$ and CK2, $\overline{CK2}$, and the pair of the clocks CKa and $\overline{CKa}$ continues to be utilized as the clocks CK3 and $\overline{CK3}$, the selectivity characteristic becomes as shown by a broken line Qb in FIG. 8b. As apparent from the comparison of the characteristics Qa and Qb, the selectivity in the characteristic Qb deteriorates down to substantially half that in the characteristic Qa. If, in place of the clocks CKb and $\overline{CKb}$, the pair of the clocks CKc and $\overline{CKc}$ are commonly utilized as the clocks CK1, $\overline{CK1}$ and CK2, $\overline{CK2}$, and the pair of the clocks CKa and $\overline{CKa}$ continues to be utilized as the clocks CK3 and $\overline{CK3}$, the selectivity characteristic becomes as shown by a chain line Qc in FIG. 8b. Compared with the characteristic Qa, the selectivity in the characteristic Qc becomes almost doubles that in the characteristic Qa.

Although the gain H is also independently controllable by maintaining the frequencies of the clocks CK2, $\overline{CK2}$ and CK3, $\overline{CK3}$ unchanged and varying the frequency of the clocks CK1 and $\overline{CK1}$, further description is omitted here, because, as mentioned above, the controllability of the gain H has no particular relation with the feasibility of the present invention.

In this manner, since, in the filter as shown in FIG. 6, its cut-off frequency is variable, it can be employed as the filters 302, 606 and 702 in the embodiment of FIG. 5. In that case, the clock signal for varying the cut-off frequency is applied from the clock generator 708. As a result, for example, the analog-to-digital converter 304 samples the source signal at the sampling frequency in response to the position of the pickup and the source signal is filtered by the filter 302 which has the filtering characteristic corresponding to the sampling frequency.

Figure 9:
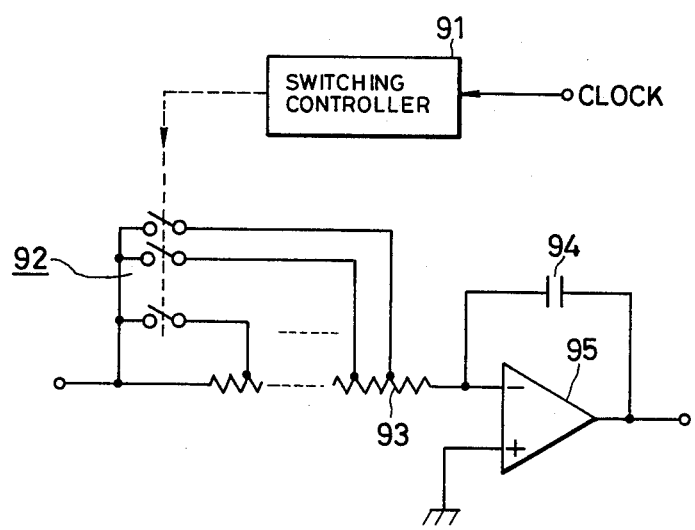
FIG. 9 shows another example of the filter capable of being utilized in the signal processing apparatus of FIG. 5.

In the following, the explanation will be made of other examples of a filter the cut-off frequency of which is changeable. FIG. 9 shows an arrangement of a first-order low pass filter which utilizes usual resistors in place of the SC resistors. In the figure, a switching controller 91 receives the clock signal from the clock generator 708 in FIG. 5 and produces a signal controlling the switching operation of a group of switches 92. One of the switches 92 is selected to close in response to the output of the controller 91. The relation of the frequency of the clock signal and a switch to be selected is stored in advance in the controller 91. The switches 92 selectively short-circuits a part of a resistor 93 connected to one of input terminals of an operational amplifier 95, the other input terminal of which is grounded. Across the one input terminal and an output terminal of the amplifier 95, a capacitor 94 is provided.

In this manner, the cut-off frequency of the filter shown in FIG. 9 can be varied by selecting the operation of the switches 92 in accordance with the frequency of the clock signal applied to the controller 91. Further, it will be understood that the cut-off frequency of the filter as shown in FIG. 9 can be also varied by changing the capacitance value of the capacitor 94.

The filter as shown in FIG. 9, in which the resistance value (or the capacitance value) is changed stepwise, can not vary its cut-off frequency so continuously that the switched-capacitor filter can. However, it is sufficiently useful in the case as follows. The linear velocities of the tracks, although they change continuously in accordance with the track which is followed by the pickup at that time, are represented by a few discrete values; e.g., a first value for the outer tracks, a second one for the middle tracks and a last one for the inner tracks, and the sampling frequencies are selected in response to the represented discrete values. In such a case, the cut-off frequency of the filter are sufficient to be set at the values corresponding to those selected sampling frequencies.

Figure 10:
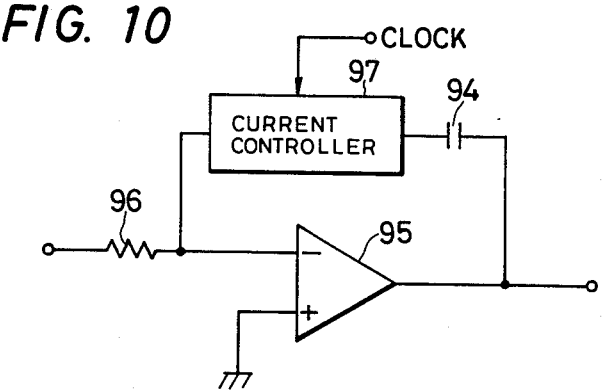
FIG. 10 shows still another example of the filter capable of being utilized in the signal processing apparatus shown in FIG. 5.

In the filter of FIG. 9, the current flowing through the capacitor 94 can be controlled instead of changing the resistance value of the resistor 93. FIG. 10 shows such an example, in which a fixed resistor 96 is connected to the one input terminal of the amplifier 95 and a current controller 97 is provided in a series with the capacitor 94. The controller 97 receives the clock signal from the clock generator 708 and controls the current flowing through the capacitor 94 in accordance with the frequency of the received clock signal. Also with this arrangement, the time constant of the filter changes and therefore the cut-off frequency thereof can be varied in accordance with the frequency of the clock signal.

What is claimed is:

1. A signal processing apparatus for a disc memory device which includes a disc with a plurality of pits arranged at equal intervals along tracks defined on the surface of the disc, at which pits digital signals are recorded bit by bit and a pickup tracking a predetermined one of the tracks to record signals at the pits or read out recorded signals from the pits, comprising;
   recording means for processing a source signal to be recorded to change the source signal into the form suited for the recording, and
   reproducing means for processing a digital signal read out from the disc to generate a reproduced signal,
   characterized in that
   there is further provided means for detecting the linear velocity of a track, which is at present followed by the pickup, the linear velocities of the tracks being varied in accordance with the position of the pickup relative to the disc which is rotated at the constant angular velocity,
   said recording means has an analog-to-digital converter for sampling the source signal at predetermined sampling frequencies and converting a sampled signal into a digital signal, the sampling frequencies being varied in accordance with the linear velocity detected by said detecting means and a low pass filter for filtering the source signal supplied for the analog-to-digital converter, the cut-off frequency of which is varied in response to the present sampling frequency, and
   said reproducing means has a digital-to-analog converter for converting a digital signal read out into an analog signal and a low pass filter for filtering the analog signal converted by the digital-to-analog converter, the digital-to-analog conversion and the cut-off frequency of the filter being controlled in accordance with the linear velocity detected by said detecting means.

2. A signal processing apparatus for a disc memory device according to claim 1, wherein said detecting means detects a synchronizing code attached to every frames of signals recorded or to be recorded and generates a clock signal on the basis of the detected synchronizing code, and the operation of said recording means and said reproducing means is controlled by the clock signal.

3. A signal processing apparatus for a disc memory device according to claim 2, wherein the synchronizing code is made up of the number m of bits, which are all written by a logical "1", and when the number m of the successive logical "1"s are detected, the clock signal, the frequency of which is determined by the time interval of the detected logical "1"s, is generated.

4. A signal processing apparatus for a disc memory device according to claim 1, wherein the filter in said recording means and said reproducing means is formed by a switched capacitor filter and switching operation of switches included in the switched capacitor filter is controlled by a clock signal the frequency of which varies in accordance with the linear velocity detected by said detecting means.

5. A signal processing apparatus for a disc memory device according to claim 1, wherein the linear velocities of the tracks are represented by a few sets of discrete values in accordance with the position of the pickup relative to the disc.

6. A signal processing apparatus for a disc memory device according to claim 5, wherein the tracks are divided into three portions in the radius direction of the disc and the linear velocities of the tracks are represented by three discrete values, a first one of which is for the inner tracks, a second one is for the tracks of the middle portion and the last one is for the outer tracks.

* * * * *